US012652359B2

(12) United States Patent
Suzuki

(10) Patent No.: US 12,652,359 B2
(45) Date of Patent: Jun. 9, 2026

(54) INFORMATION PROCESSING DEVICE, IMAGE READING APPARATUS, IMAGE FORMING APPARATUS, NON-TRANSITORY COMPUTER READABLE MEDIUM STORING PROGRAM, AND INFORMATION PROCESSING METHOD FOR DETECTING MOVEMENT OF A DOCUMENT AND MAKING A DETERMINATION BASED ON THE DETECTED MOVEMENT

(71) Applicant: FUJIFILM Business Innovation Corp., Tokyo (JP)

(72) Inventor: Tetsuo Suzuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/184,046

(22) Filed: Mar. 15, 2023

(65) Prior Publication Data

US 2024/0106947 A1 Mar. 28, 2024

(30) Foreign Application Priority Data

Sep. 27, 2022 (JP) ................................. 2022-153323

(51) Int. Cl.
*H04N 1/00* (2006.01)

(52) U.S. Cl.
CPC ..... *H04N 1/00381* (2013.01); *H04N 1/00809* (2013.01); *H04N 1/00811* (2013.01)

(58) Field of Classification Search
CPC ........... H04N 1/00381; H04N 1/00809; H04N 1/00811
See application file for complete search history.

(56) References Cited

U.S. PATENT DOCUMENTS

| | | | | |
|---|---|---|---|---|
| 2018/0330186 A1* | 11/2018 | Yabuuchi | ............... | G06V 30/40 |
| 2019/0149680 A1* | 5/2019 | Ikeda | .................... | H04N 1/387 |
| | | | | 358/1.15 |
| 2019/0238718 A1* | 8/2019 | Miyaji | ............... | H04N 1/00689 |

FOREIGN PATENT DOCUMENTS

JP 2005-268906 A 9/2005

* cited by examiner

*Primary Examiner* — Nicholas Pachol
(74) *Attorney, Agent, or Firm* — Oliff PLC

(57) ABSTRACT

An information processing device includes a processor configured to: detect movement of a document placed on a document stand included in a device that reads the document by capturing an image of the document stand; and make a determination related to reading of the document based on the movement of the document on the document stand.

16 Claims, 12 Drawing Sheets

11a CPU

11b RAM

11c ROM

11d NON-VOLATILE MEMORY

11e INTERFACE UNIT

12 SECONDARY STORAGE

13 COMMUNICATION UNIT

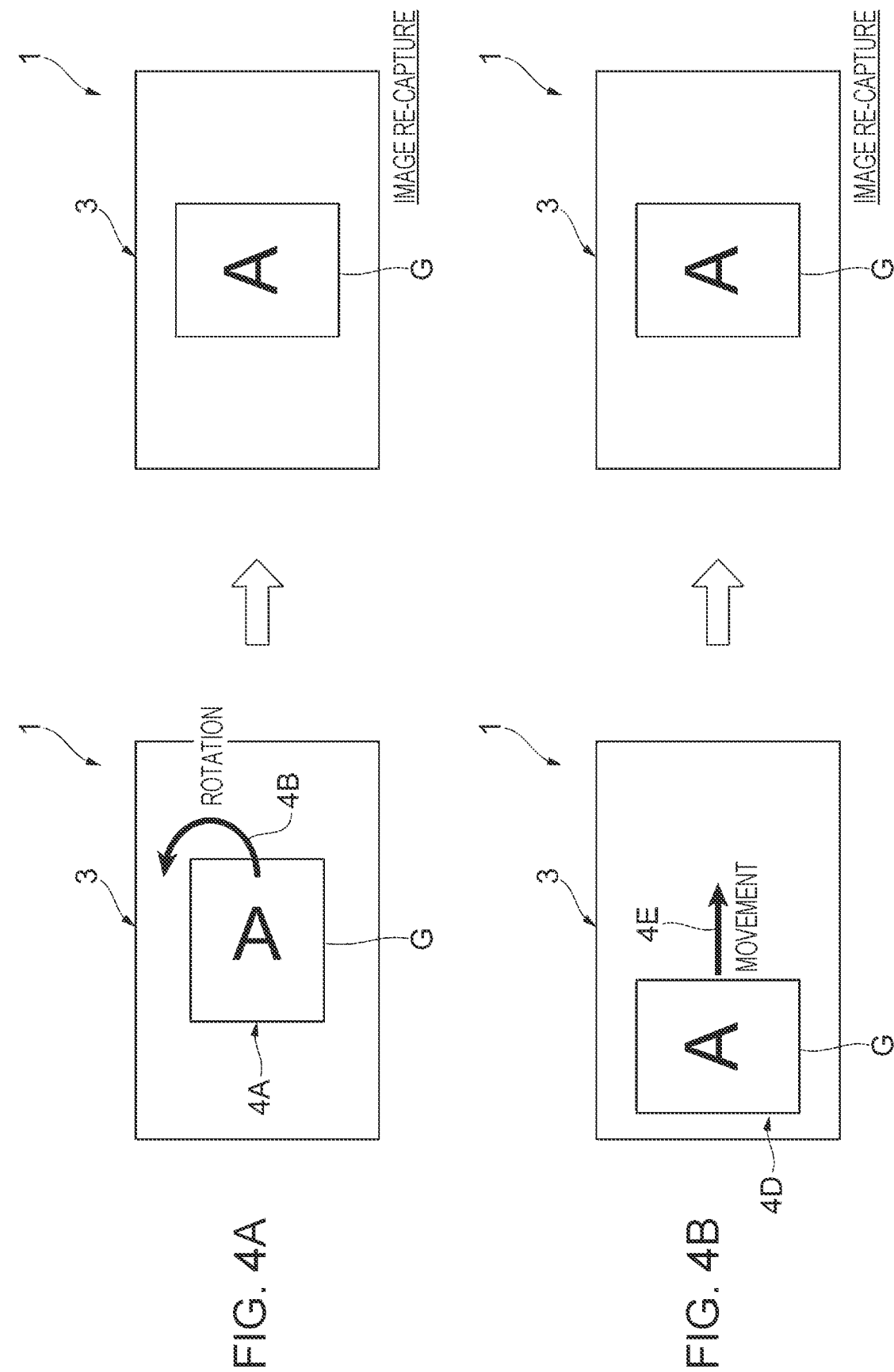

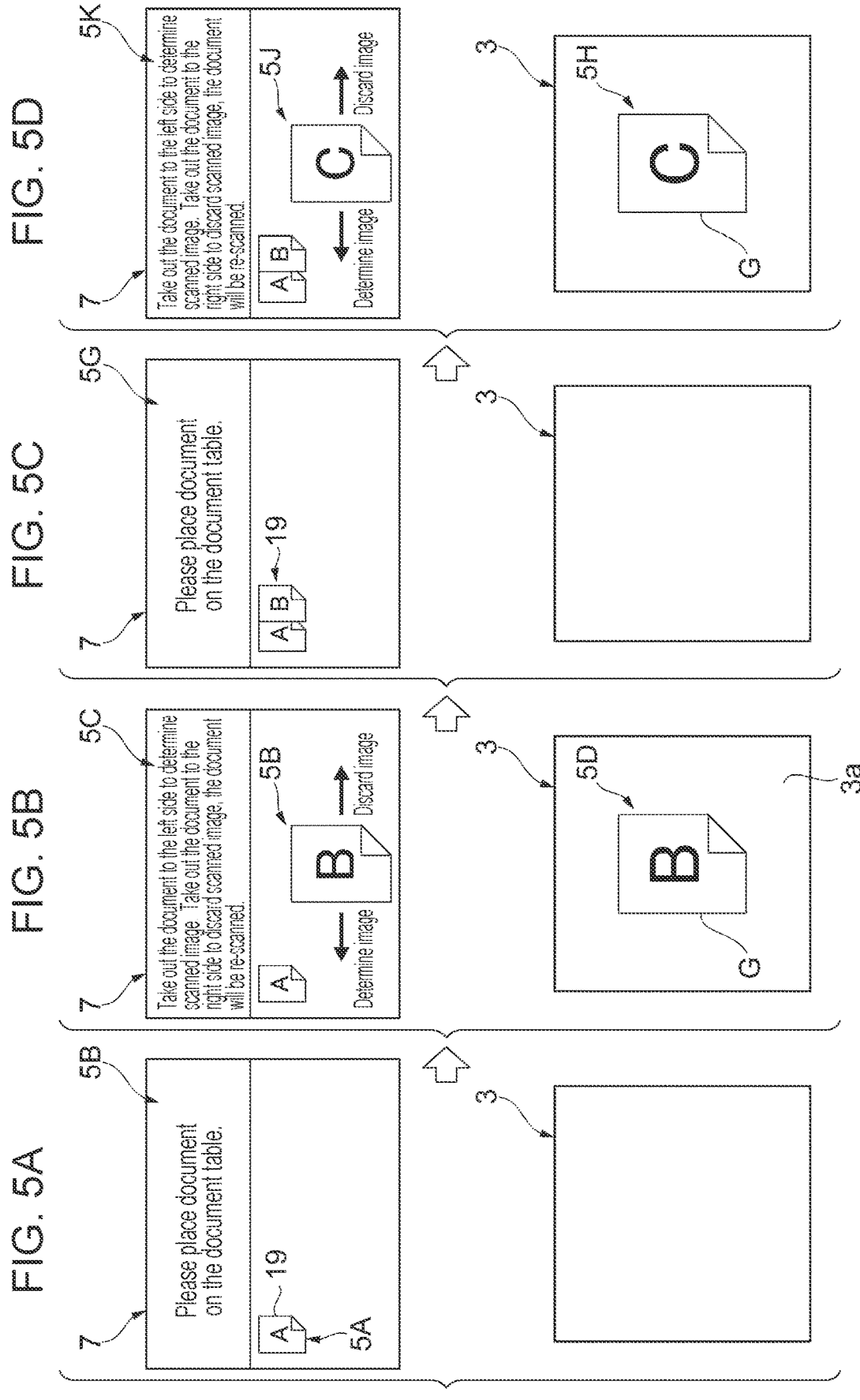

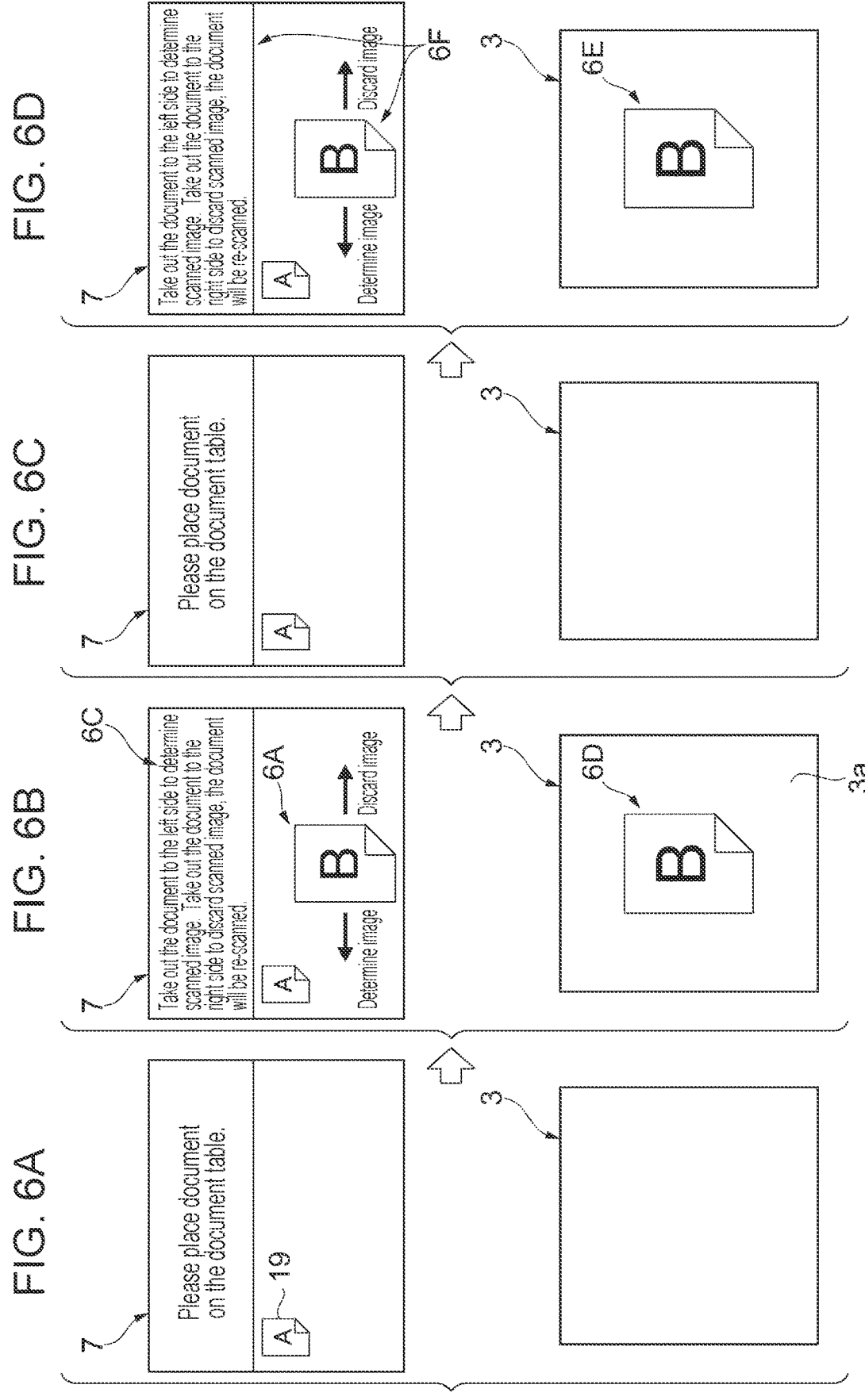

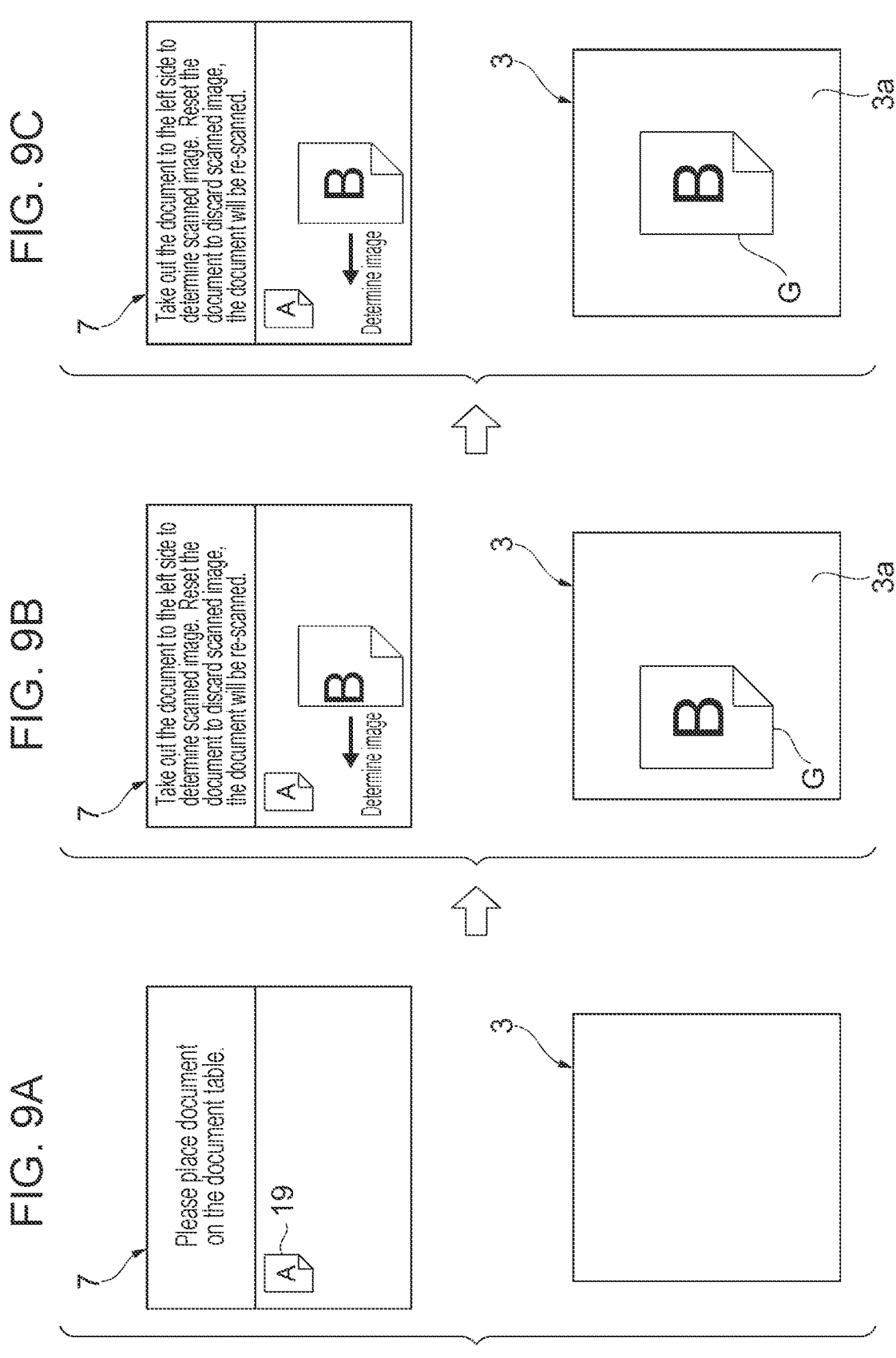

INFORMATION PROCESSING DEVICE, IMAGE READING APPARATUS, IMAGE FORMING APPARATUS, NON-TRANSITORY COMPUTER READABLE MEDIUM STORING PROGRAM, AND INFORMATION PROCESSING METHOD FOR DETECTING MOVEMENT OF A DOCUMENT AND MAKING A DETERMINATION BASED ON THE DETECTED MOVEMENT

CROSS-REFERENCE TO RELATED APPLICATIONS

This application is based on and claims priority under 35 USC 119 from Japanese Patent Application No. 2022-153323 filed Sep. 27, 2022.

BACKGROUND

(i) Technical Field

The present disclosure relates to an information processing device, an image reading apparatus, an image forming apparatus, a non-transitory computer readable medium storing a program, and an information processing method.

(ii) Related Art

Japanese Unexamined Patent Application Publication No. 2005-268906 discloses a process that, upon detection of a scan error condition from scan data, adds a marker indicating necessity of re-scanning to the scan data based on a marker condition read from a marker condition storage.

SUMMARY

In general, when a document is read, various types of determinations are made, then processing related to the reading is performed.

Here, when a determination related to reading of a document is made based on an operation of a user on a receiving device that receives a user's operation, the operation of a user on the receiving device is required.

In this situation, the operability of a user is likely to reduce, as compared to when the operation of a user on a receiving device is not needed.

Aspects of non-limiting embodiments of the present disclosure relate to an information processing device that improves the operability of a user who performs reading of a document, as compared to when a determination related to reading of a document is made based on the operation of a user on a receiving device that receives a user's operation.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including a processor configured to: detect movement of a document placed on a document stand included in a device that reads the document by capturing an image of the document stand; and make a determination related to reading of the document based on the movement of the document on the document stand.

BRIEF DESCRIPTION OF THE DRAWINGS

Exemplary embodiment of the present disclosure will be described in detail based on the following figures, wherein:

FIG. 1 is a perspective view illustrating the entire configuration of an image reading apparatus;

FIG. 2 is a diagram for explaining the hardware configuration of an information processing device;

FIGS. 4A and 4B are views for explaining other processes executed in the image reading apparatus;

FIGS. 5A to 5D are views for explaining the flow of a series of processes executed in the image reading apparatus;

FIGS. 6A to 6D are views illustrating another process example;

FIGS. 9A to 9C are views illustrating another process example;

DETAILED DESCRIPTION

Figure 3A:
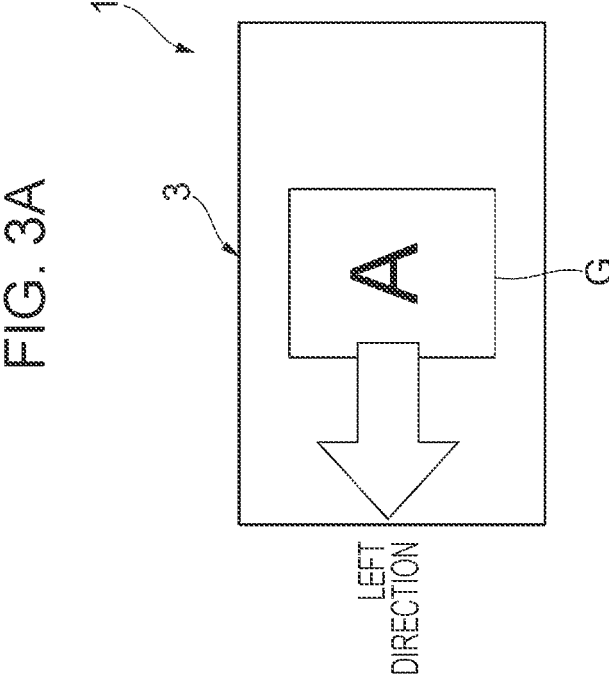
FIGS. 3A and 3B are views for explaining processes executed in the image reading apparatus.

Hereinafter, an exemplary embodiment of the present disclosure will be described with reference to the accompanying drawings.

Figure 1:
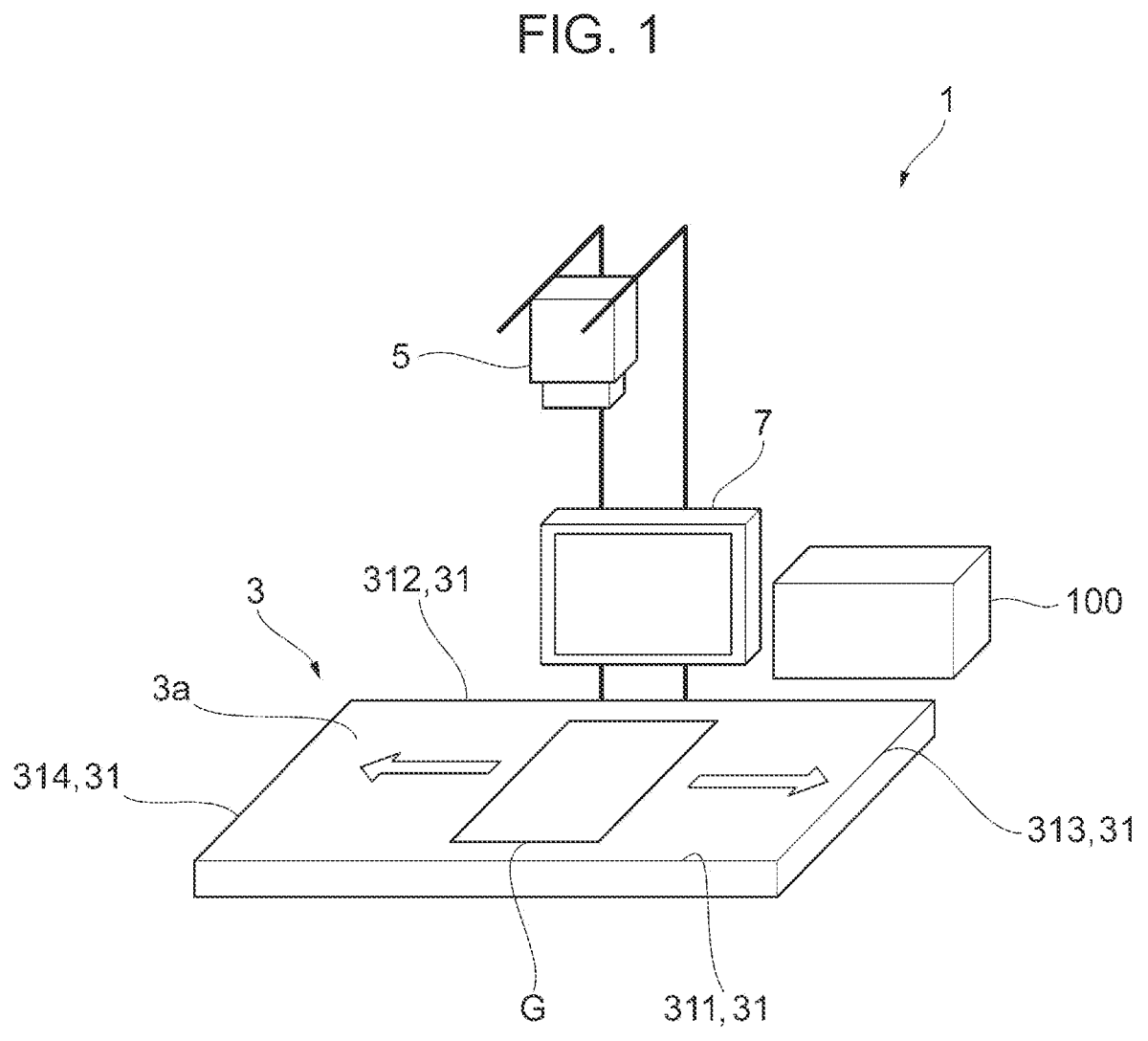

FIG. 1 is a perspective view illustrating the entire configuration of an image reading apparatus 1.

The image reading apparatus 1 of the exemplary embodiment is so-called a document camera.

The image reading apparatus 1 is provided with a document stand 3 on which a document G as a target image to be read is placed, and which supports the document G from below; a camera 5 as an example of an image capture device that captures the document G placed on the document stand 3; and a display device 7 that displays information to a user. The image reading apparatus 1 is an apparatus that reads the document G by capturing the document stand 3 on which the document G is placed.

In addition, the image reading apparatus 1 is provided with an information processing device 100 that processes information related to capturing the document G. The information processing device 100 is coupled to the camera 5, and the display device 7 through a communication line which is not illustrated. As described below, the information processing device 100 makes various determinations related to reading of the document G.

The camera 5 is disposed above the document stand 3 with a space therebetween. The camera 5 includes an image pickup device such as a charge coupled device (CCD), and captures an image of the document stand 3 located below. In the exemplary embodiment, the document stand 3 is within the angle of view of the camera 5, which captures an image of the entirety of the document stand 3.

The display device 7 is comprised of, for example, a liquid crystal display or an organic EL display, and displays information of which a user operating the image reading apparatus 1 is notified.

In the exemplary embodiment, the display device 7 is comprised of a so-called touch panel, and not only displays information, but also receives an operation of a user.

The document stand 3 is formed in a rectangular shape, and has four sides 31. In the exemplary embodiment, as the four sides 31, a front-side side 311, a far-side side 312, a right-side side 313, and a left-side side 314 are provided.

When a user operates the image reading apparatus 1, a user is positioned in front of the front-side side 311. In other words, in the exemplary embodiment, a user is positioned on the opposite side to where the far-side side 312 is positioned across the front-side side 311.

In the exemplary embodiment, an image of document G is automatically captured.

In the exemplary embodiment, when document G is placed on the document stand 3, the information processing device 100 detects the document G based on an image obtained by the camera 5.

Upon detection of the document G, the information processing device 100 operates the camera 5 to capture an image of the document stand 3 on which the document G is placed. Thus, the captured image of the document G is obtained. The captured image is a still image.

Note that capturing an image of the document G is not necessarily performed automatically, and may be performed according to instructions from a user.

Figure 2:
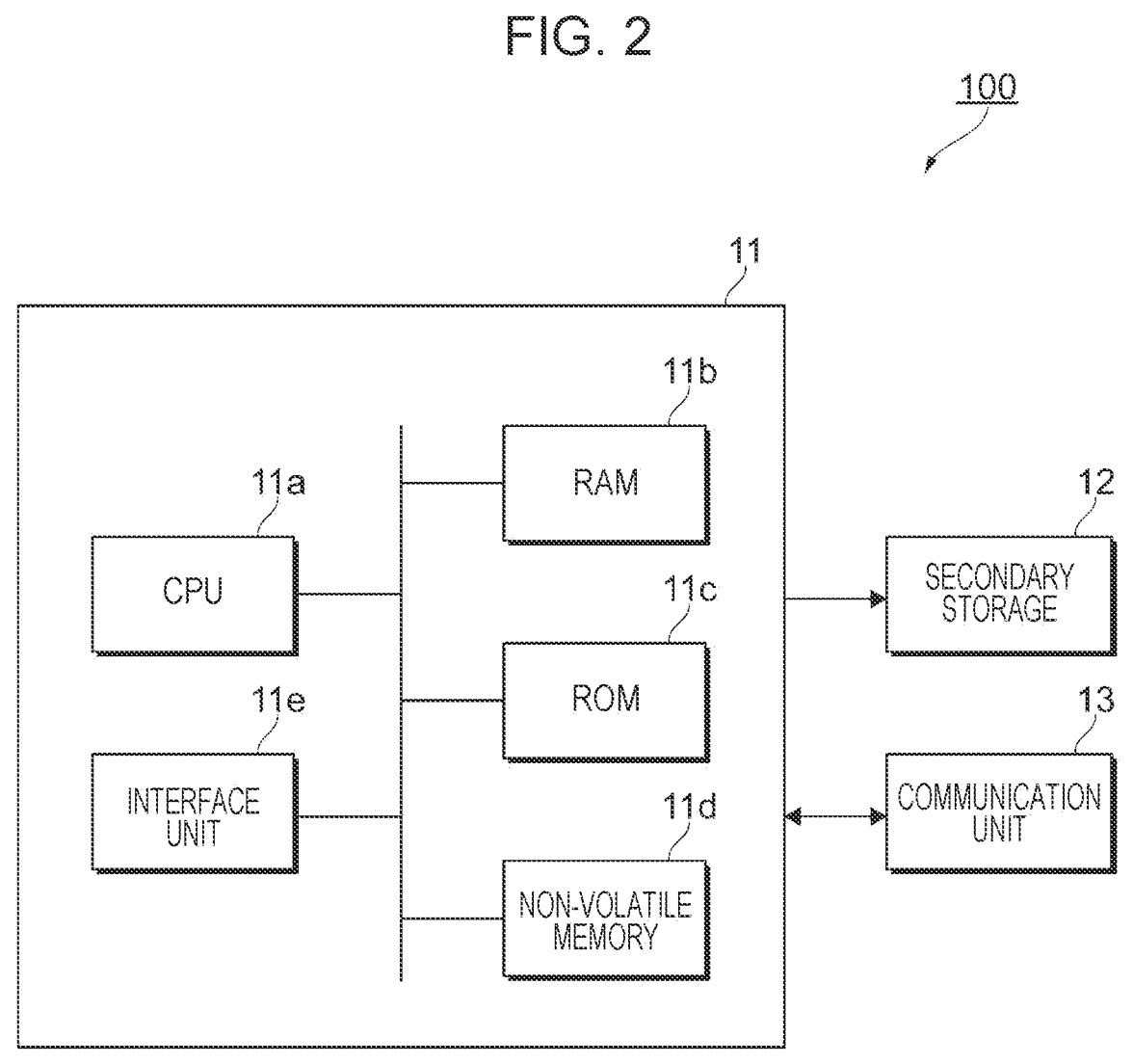

FIG. 2 is a diagram for explaining the hardware configuration of the information processing device 100.

The information processing device 100 has an arithmetic processor 11 that executes digital arithmetic processing in accordance with a program; a secondary storage 12 that stores information such as a program; and a communication unit 13 that transmits and receives information to and from an external device.

The secondary storage 12 is implemented by existing information storage devices such as a hard disk drive (HDD), a semiconductor memory, and a magnetic tape, for example.

The arithmetic processor 11 is provided with a CPU 11a as an example of a processor. In the exemplary embodiment, the CPU 11a executes the processes described below.

In addition, the arithmetic processor 11 includes a RAM 11b used as a work memory for the CPU 11a, and a ROM 11c that stores programs executed by the CPU 11a.

In addition, the arithmetic processor 11 includes a rewritable non-volatile memory 11d that can hold data even when power supply is off; and an interface unit 11e that controls the components of the communication unit 13 connected to the arithmetic processor 11.

The non-volatile memory 11d is comprised of, for example, a SRAM or a flash memory backed up by a battery.

In the exemplary embodiment, the arithmetic processor 11 reads programs stored in the secondary storage 12 or the ROM 11c to execute the processes described below.

The arithmetic processor 11, the secondary storage 12, and the communication unit 13 are connected through a bus or a signal line.

The programs to be executed by the CPU 11a can be provided to the information processing device 100 with each program recorded on a computer-readable recording medium, such as a magnetic recording medium (such as a magnetic tape, a magnetic disk), an optical recording medium (such as an optical disk), a magneto optical recording medium, and a semiconductor memory. Alternatively, the programs to be executed by the CPU 11a may be provided to the information processing device 100 using a communication unit such as the Internet.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Figure 3B:
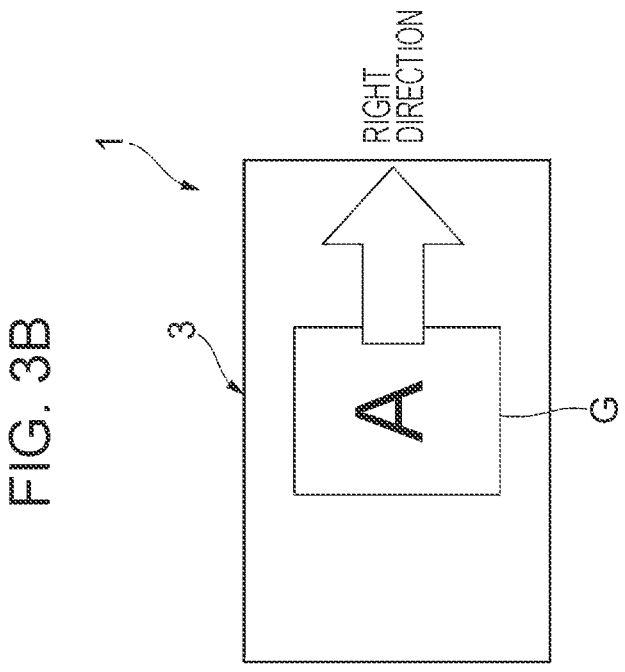

FIGS. 3A, 3B are illustrations for explaining processes executed in the image reading apparatus 1.

To read document G in the image reading apparatus 1, first, as illustrated in FIG. 3A, the document G is placed on the document stand 3.

Next, capturing by the camera 5 (see FIG. 1) is performed, and an image obtained by capturing the document G is acquired.

In the exemplary embodiment, the entirety of the document stand 3 is captured by the camera 5, and the captured image includes not only an image of the document G, but also an image of the document stand 3.

Subsequently, the document G is removed from the document stand 3 by a user.

In the exemplary embodiment, for example, when the document G is moved in the left direction as illustrated by an arrow of FIG. 3A, and removed from the document stand 3 by a user, a determinate process is performed on the obtained captured image, specifically a process of saving the captured image in the secondary storage 12 (see FIG. 2) is performed.

In contrast, in the exemplary embodiment, for example, when the document G is moved in the right direction as illustrated by an arrow of FIG. 3B, and removed from the document stand 3 by a user, a process of discarding the obtained captured image is performed. In this situation, a process of saving the captured image in the secondary storage 12 is not performed.

In the exemplary embodiment, the CPU 11a makes a determination related to reading of the document G in this manner based on the movement of the document G on the document stand 3. More specifically, the CPU 11a makes a determination related to reading of the document G based on the movement direction of the document G when moved along surface 3a (see FIG. 1) of the document stand 3.

The example illustrated in FIGS. 3A, 3B exemplifies a case in which the CPU 11a makes a determination related to handling of a result of reading of the document G based on the movement of the document G on the document stand 3.

The CPU 11a detects the movement of the document G on the document stand 3 based on an image obtained by capturing the document stand 3 with the camera 5. The CPU 11a then makes a determination related to handling of a result of reading of the document G based on the detected movement.

Specifically, as described above, when the document G is moved in the left direction, the CPU 11a causes a determinate process to be performed on the obtained captured image, specifically a process of saving the captured image in the secondary storage 12 to be performed.

In other words, when the movement of the document G on the document stand 3 is a predetermined specific movement, the CPU 11a makes a determination to store the captured image, which is an example of a result of reading, in the second storage 12 which is an example of an information storage.

In addition, when the document G is moved in the right direction, the CPU 11*a* makes a determination to perform a process of discarding the obtained captured image.

In other words, when the movement of the document G on the document stand 3 is a predetermined specific movement, the CPU 11*a* makes a determination to discard the captured image, which is an example of a result of reading.

The CPU 11*a* detects the movement of the document G on the document stand 3. The CPU 11*a* then makes a determination related to reading of the document G based on the movement of the document G on the document stand 3.

Here, "the determination related to reading of the document G" includes, for example, a determination (described later) related to reading condition for the document G, a determination related to saving or discarding the captured image obtained by reading the document G, and a determination (described later) related to output of the captured image obtained by reading the document G.

The CPU 11*a* identifies the movement direction of the document G on the document stand 3 based on the image obtained by the camera 5. The CPU 11*a* then makes a determination related to the captured image based on the identified movement direction.

Specifically, as described above, the CPU 11*a* makes a determination based on the identified movement direction to perform a determinate process on the captured image or a process of discarding the captured image, for example.

FIGS. 4A, 4B are illustrations for explaining other processes executed in the image reading apparatus 1.

In also the process example illustrated in FIG. 4A, as described above, first, as indicated by symbol 4A, the document G is placed on the document stand 3. Next, image capturing is performed by the camera 5 (see FIG. 1), and the captured image including an image of the document G and an image of the document stand 3 is obtained.

Subsequently, as indicated by arrow 4B of FIG. 4A, the document G placed on the document stand 3 is rotated by a user.

In this situation, the CPU 11*a* detects the rotation based on the image captured by the camera 5. When detecting the rotation of the document G, the CPU 11*a* operates the camera 5 to re-capture the document G after the rotation.

FIG. 4B is an illustration for explaining another process executed in the image reading apparatus 1.

In also the process example illustrated in FIG. 4B, as described above, first, as indicated by symbol 4D, the document G is placed on the document stand 3. Next, image capturing is performed by the camera 5, and the captured image including an image of the document G and an image of the document stand 3 is obtained.

Subsequently, as indicated by arrow 4E of FIG. 4B, the document G placed on the document stand 3 is moved by a user.

In this situation, the CPU 11*a* detects the movement based on the image captured by the camera 5. When detecting the movement of the document G, the CPU 11*a* operates the camera 5 to re-capture the document G after the movement.

FIGS. 5A to 5D are illustrations for explaining the flow of a series of processes executed in the image reading apparatus 1. In each of FIGS. 5A to 5D, a state of the display device 7 is illustrated in the upper section, and a state of the document stand 3 is illustrated in the lower section.

In the exemplary embodiment, when an image of the document G is captured, as described above, first, the document G is placed on the document stand 3. In this example, first, document A (not illustrated) as an example of the document G is placed on the document stand 3. Next, an image of the document A is captured. Thus, the captured image of the document A is obtained.

In this process example, the document A is moved in the left direction, then removed from the document stand 3. Thus, a determinate process is performed on the document A as an example of the document G, that is, the captured image of the document A is saved.

In the exemplary embodiment, when the determinate process is performed on the document G, as indicated by symbol 5A in FIG. 5A, a correspondence image 19 is displayed on the display device 7, the correspondence image 19 being an image corresponding to the captured image of the document G.

The correspondence image 19 is not particularly limited, and is, for example, a reduced image of the captured image of the document G. In other words, the correspondence image 19 is, for example, a thumbnail image of the captured image of the document G.

The correspondence image 19 is an image indicating that the captured image of the document G is already saved. After the above-mentioned determinate process is performed, the correspondence image 19 is displayed on the display device 7.

Furthermore, in the exemplary embodiment, when the determinate process is performed on the document G, as indicated by symbol 5B in FIG. 5A, "Please place a document on the document stand" is displayed. In other words, when the determinate process is performed on the document G, notification is given to prompt a user to set a new document G on the document stand 3.

Note that here, a case has been described in which the notification is given when the determinate process is performed on the document G; however, in the exemplary embodiment, the notification is also given when a process of discarding the document G is performed.

Next, in this process example, as illustrated in FIG. 5B, document B, which is an example of a new document G, is placed on the document stand 3.

As described above, also in this situation, an image of the document B is captured. Thus, the captured image of the document B is obtained. As indicated by the symbol 5B, the captured image of the document B is displayed on the display device 7.

Furthermore, as indicated by symbol 5C of FIG. 5B, display (hereinafter referred to as an "operation method display") showing an operation method for the document B, and display (hereinafter referred to as a "process content display") of the content of a process to be executed when the document B is operated are shown on the display device 7.

In this process example, as the operation method display, and the process content display, display is provided which indicates that when the document G is moved to the left side and removed from the document stand 3, a determinate process is performed.

In addition, in this process example, as the operation method display, and the process content display, display is provided which indicates that when the document G is moved to the right side and removed from the document stand 3, a process of discarding the captured image is performed, and re-reading of the document G is performed.

Subsequently, in this process example, an operation for the document B is performed by a user. Specifically, in this process example, a user performs an operation of moving the document B indicated by symbol 5D of FIG. 5B to the left direction along the surface 3a of the document stand 3 to remove the document B from the document stand 3.

Thus, in this situation, a determinate process is performed on the captured image, specifically, the captured image of the document B is saved in the secondary storage 12, and registered therein.

In this situation, as illustrated in FIG. 5C, a correspondence image 19 corresponding to the document B is displayed. Furthermore, in this situation, as described above, the display indicated by symbol 5G is provided on the display device 7 to give a notification to prompt a user to set a new document G on the document stand 3.

Subsequently, in this process example, as indicated by symbol 5H of FIG. 5D, a new document C is placed on the document stand 3 by a user.

As described above, also in this situation, an image of the document C is captured. Thus, the captured image of the document C is obtained, and as indicated by symbol 5J, the captured image is displayed on the display device 7.

In addition, as described above, in this situation, as indicated by symbol 5K, the operation method display for the document C, and the process content display for the document C are provided on the display device 7.

Also, in this situation, as the operation method display, and the process content display, display is provided which indicates that when the document G is moved to the left side and removed from the document stand 3, a determinate process is performed.

Also, in this situation, as the operation method display, and the process content display, display is provided which indicates that when the document G is moved to the right side and removed from the document stand 3, a process of discarding the captured image is performed, and re-reading of the document G is performed.

Subsequently, an operation for the document C is performed by a user.

When the document C is moved in the left direction, and removed from the document stand 3 by a user, as described above, a determinate process is performed on the captured image of the document C.

In addition, when the document C is moved in the right direction, and removed from the document stand 3 by a user, a process of discarding the captured image of the document C is performed.

FIGS. 6A to 6D are illustrations showing another process example.

Also, in this process, as described above, first, an image of the document A is captured.

Thus, the captured image of the document A is obtained. Also, as described above, as illustrated in FIG. 6A, a correspondence image 19, which is an image corresponding to the captured image of the document A, is displayed on the display device 7.

Next, also in this process example, as indicated by symbol 6D of FIG. 6B, document B is placed on the document stand 3.

As described above, also in this situation, an image of the document B is captured. Thus, the captured image of the document B is obtained. As indicated by symbol 6A of FIG. 6B, the captured image is displayed on the display device 7. Furthermore, as described above, as indicated by symbol 6C of FIG. 6B, the operation method display for the document B, and the process content display for the document B are provided on the display device 7.

Subsequently, an operation for the document B is performed by a user. Specifically, in this process example, a user moves the document B (see symbol 6D of FIG. 6B) in the right direction along the surface 3a of the document stand 3, and removes the document B from the document stand 3.

Thus, in this situation, the captured image of the document B is discarded. In this situation, as illustrated in FIG. 6C, no correspondence image 19 corresponding to the document B is displayed on the display device 7.

When the document B is removed from the document stand 3, as described above, as illustrated in FIG. 6C, a notification is given on the display device 7 to prompt a user to set a new document G on the document stand 3.

Accordingly, in this process example, as indicated by symbol 6E of FIG. 6D, the document B is placed again on the document stand 3 by a user.

In this situation, an image of the document B is captured again. Thus, the captured image of the document B is obtained again.

When the captured image is obtained, as described above, as indicated by symbol 6F, the captured image is displayed on the display device 7, and the operation method display for the document B, and the process content display for the document B are further provided on the display device 7.

Subsequently, an operation for the document B is performed by a user.

In this situation, when the document B is moved in the left direction, and removed from the document stand 3 by a user, a determinate process is performed.

In addition, when the document B is moved in the right direction, and removed from the document stand 3 by a user, a process of discarding the captured image of the document B is performed.

Figure 7:
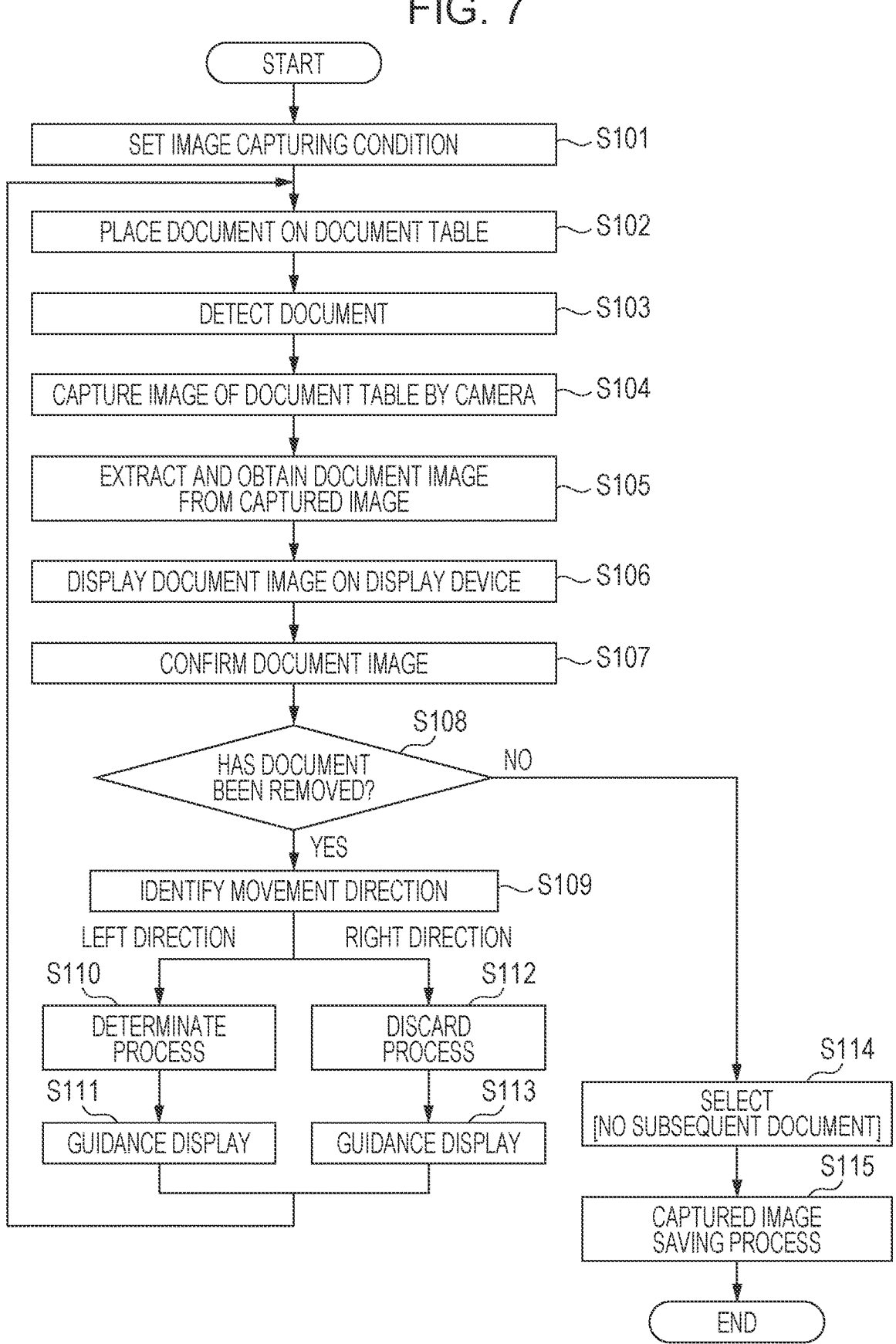
FIG. 7 is a flowchart illustrating the details of a process when the process is executed.

FIG. 7 is a flowchart illustrating the details of the processes explained in FIGS. 5A to 5D and FIGS. 6A to 6D when they are executed.

In the exemplary embodiment, a user first sets a condition for image capturing (step S101). Specifically, a user performs, for example, an operation for the display device 7 to set a condition for image capturing.

Next, a user places the document G on the document stand 3 (step S102).

The CPU 11a then detects the document G placed on the document stand 3 based on an image captured by the camera 5 (step S103). Upon detection of the document G, the CPU 11a operates the camera 5 to capture an image of the document stand 3 on which the document G is placed (step S104). Thus, the captured image including both the document G and the document stand 3 is obtained.

Subsequently, the CPU 11a extract and obtains a portion of the captured image, the portion (hereinafter referred to as a "document image") where the document G is scanned (step S105).

The CPU 11a then causes the display device 7 to display the document image (step S106). At this point, the CPU 11a performs a process of displaying the above-mentioned operation method display and process content display. Thus, the display device 7 performs the display illustrated in FIG. 5B and FIG. 6B.

Subsequently, a user refers to the display device 7 to check the document image (step S107).

Then, the CPU 11a determines whether the document G has been removed from the document stand 3 (step S108). Specifically, the CPU 11a analyzes the image obtained by the camera 5, and determines whether the document G has been removed from the document stand 3.

When determining that the document G has been removed, the CPU 11a identifies the movement direction of the document G (step S109).

When determining that the movement direction of the document G is the left direction, the CPU 11a performs the above-described determinate process (step S110). Specifically, in this situation, the CPU 11a performs a process of saving a captured image in the secondary storage 12. Furthermore, in this situation, the CPU 11a displays a correspondence image 19 corresponding to the document G on the display device 7.

Subsequently, the CPU 11a displays guidance on the display device 7 to prompt a user to set a new document G on the document stand 3 (step S111). In other words, as described above, the CPU 11a provides a notification to prompt a user to set a new document G on the document stand 3.

Thus, the display on the display device 7 is as illustrated in FIG. 5C, for example.

In contrast, when identifying that the movement direction of the document G is the right direction, the CPU 11a performs a process of discarding the captured image (step S112). Subsequently, also in this situation, the CPU 11a displays guidance on the display device 7 to prompt a user to set a new document G on the document stand 3 (step S113).

Thus, in this situation, the display on the display device 7 is as illustrated in FIG. 6C, for example.

Note that in the exemplary embodiment, in the process of step S113, a notification is provided to prompt a user to set a new document G; however, the content of notification is not limited to this. Alternatively, for example, guidance may be displayed on the display device 7 to prompt a user to place the original document G for the discarded captured image on the document stand 3 again.

In contrast, in step S108, when it is determined that the document G has not been removed from the document stand 3, the flow proceeds to step S114.

In the process of step S114, a user selects a selection item "No subsequent document" displayed on the display device 7.

Although a description has been omitted above, in the exemplary embodiment, each time a document is read, the selection item "No subsequent document" is displayed on the display device 7. In other words, in the exemplary embodiment, each time an image of a new document is captured by the camera 5, the selection item "No subsequent document" is displayed on the display device 7.

When a user selects the selection item, the CPU 11a determines that the reading job is completed, and performs a process of saving the captured images obtained so far.

This process example exemplifies a case in which in the process of step S114, a user selects the selection item, "No subsequent document" displayed on the display device 7.

In the exemplary embodiment, when a user selects the selection item, "No subsequent document", the flow proceeds to step S115. In the process of step S115, a process of saving the captured images obtained so far as one file is performed.

In the exemplary embodiment, when a first document G is read, a reading job is started. For multiple documents G, with the reading job started, the documents G are successively set on the document stand 3, and the documents G are read sequentially.

For example, when a user provides instructions "No subsequent document", the CPU 11a determines that the last document has been read, and completes the reading job. Furthermore, in this situation, the CPU 11a generates a file consisting of multiple captured images obtained by reading the multiple documents G.

In the exemplary embodiment, for example, when a user provides instructions "No subsequent document", the CPU 11a determines that the most recently read document is the last document.

The CPU 11a generates a file consisting of the captured images obtained by capturing all documents G from the first document G to the last document G.

Figures 8A, 8B, 8C:
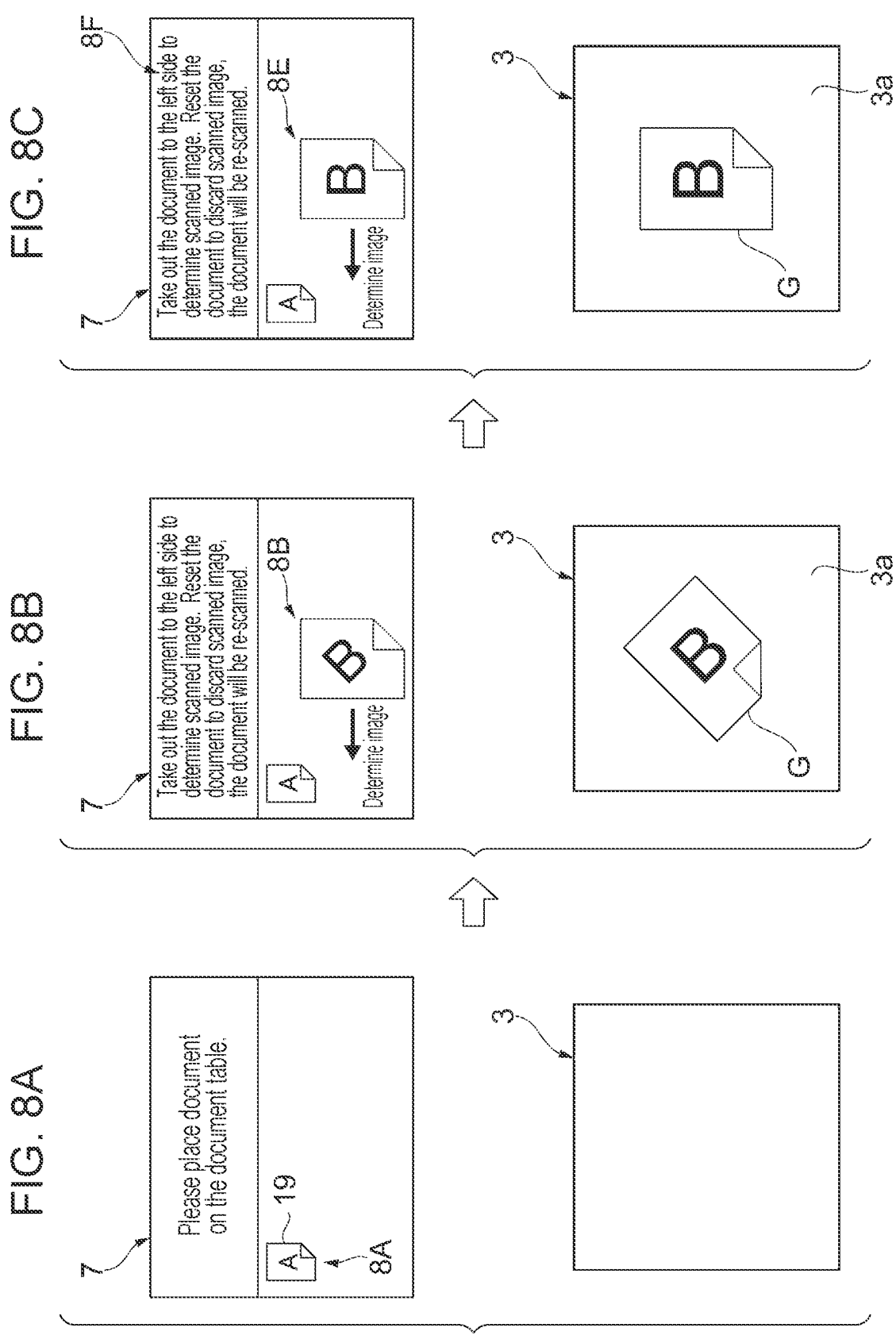
FIGS. 8A to 8C are views illustrating another process example.

FIGS. 8A to 8C are illustrations showing another process example.

Also, in this process example, first, as described above, an image of the document A is captured. Thus, also in this process example, as indicated by symbol 8A of FIG. 8A, a correspondence image 19 corresponding to the document A is displayed on the display device 7.

Subsequently, in this process example, as illustrated in FIG. 8B, the document B is placed on the document stand 3, and an image of the document B is captured.

Thus, as described above, as indicated by symbol 8B, the captured image of the document B is displayed on the display device 7. Furthermore, as described above, the operation method display for the document B, and the process content display for the document B are provided on the display device 7.

In this process example, as the operation method display and the process content display, display is provided which indicates that when the document G is moved to the left side and removed from the document stand 3, a determinate process is performed on the captured image.

Also, in this process example, as the operation method display and the process content display, display is provided which indicates that when the document G is reset, the document G is read again.

Subsequently, in this process example, as illustrated in FIG. 8C, the document B is reset on the document stand by a user.

Specifically, in this process example, as illustrated in FIGS. 8B, 8C, the document B is rotated around a rotational axis and reset by a user, the rotational axis being a line (not illustrated) perpendicular to the surface 3a of the document stand 3.

Accordingly, in this process example, an image of the document G after reset is captured. As indicated by symbol 8E of FIG. 8C, the captured image of the reset document B is displayed on the display device 7.

Furthermore, as indicated by symbol 8F of FIG. 8C, the operation method display for the document B, and the process content display for the document B are provided again.

This process example exemplifies a case in which a user has noticed that an image has been captured with the document G tilted, and thus rotates and resets the document G on the document stand 3.

In this process example, when the document B is reset, the captured image obtained by capturing before the reset is discarded. Also, when the document B is reset, an image of the document B is captured again.

In the exemplary embodiment, the CPU 11a determines whether the document G has been reset based on the image obtained by the camera 5. When the document has been reset, the CPU 11a discards the captured image obtained by capturing before the reset, and captures an image of the document B again.

For example, when the position of the document G is changed, the CPU 11a determines that the document G has been reset. In addition, for example, when the orientation of the document G is changed, the CPU 11a determines that the document G has been reset.

In this situation, as described above, the CPU 11*a* discards the captured image obtained by capturing before the reset, and captures an image of the document G after the reset.

FIGS. 9A to 9C are illustrations showing another process example.

Also, in this process example, first, as described above, an image of the document A is captured, and as illustrated in FIG. 9A, a correspondence image 19 corresponding to the document G is displayed on the display device 7.

Subsequently, also in this process example, as illustrated in FIG. 9B, the document B is placed on the document stand 3, and an image of the document B is captured.

Thus, as described above, as illustrated in FIG. 9B, the captured image of the document B is displayed on the display device 7. Furthermore, as described above, as illustrated in FIG. 9B, the operation method display for the document B, and the process content display for the document B are provided on the display device 7.

Subsequently, in this process example, the document B is reset by a user.

This process example exemplifies a case in which a user has noticed that an image has been captured with the document G displaced to the left side. In this situation, as illustrated in FIGS. 9B, 9C, a user moves the document G on the document stand 3 in the right direction, and resets the document G.

Accordingly, in the exemplary embodiment, the captured image of the document B obtained before the reset of the document G is discarded. In addition, an image of the reset document B is captured.

In the example illustrated in FIGS. 8A to 8C, FIGS. 9A to 9C, when the document G on the document stand 3 is rotated or moved, the CPU 11*a* makes a determination to re-capture the document G. Thus, in the exemplary embodiment, as described above, the document G is re-captured.

Figure 10:
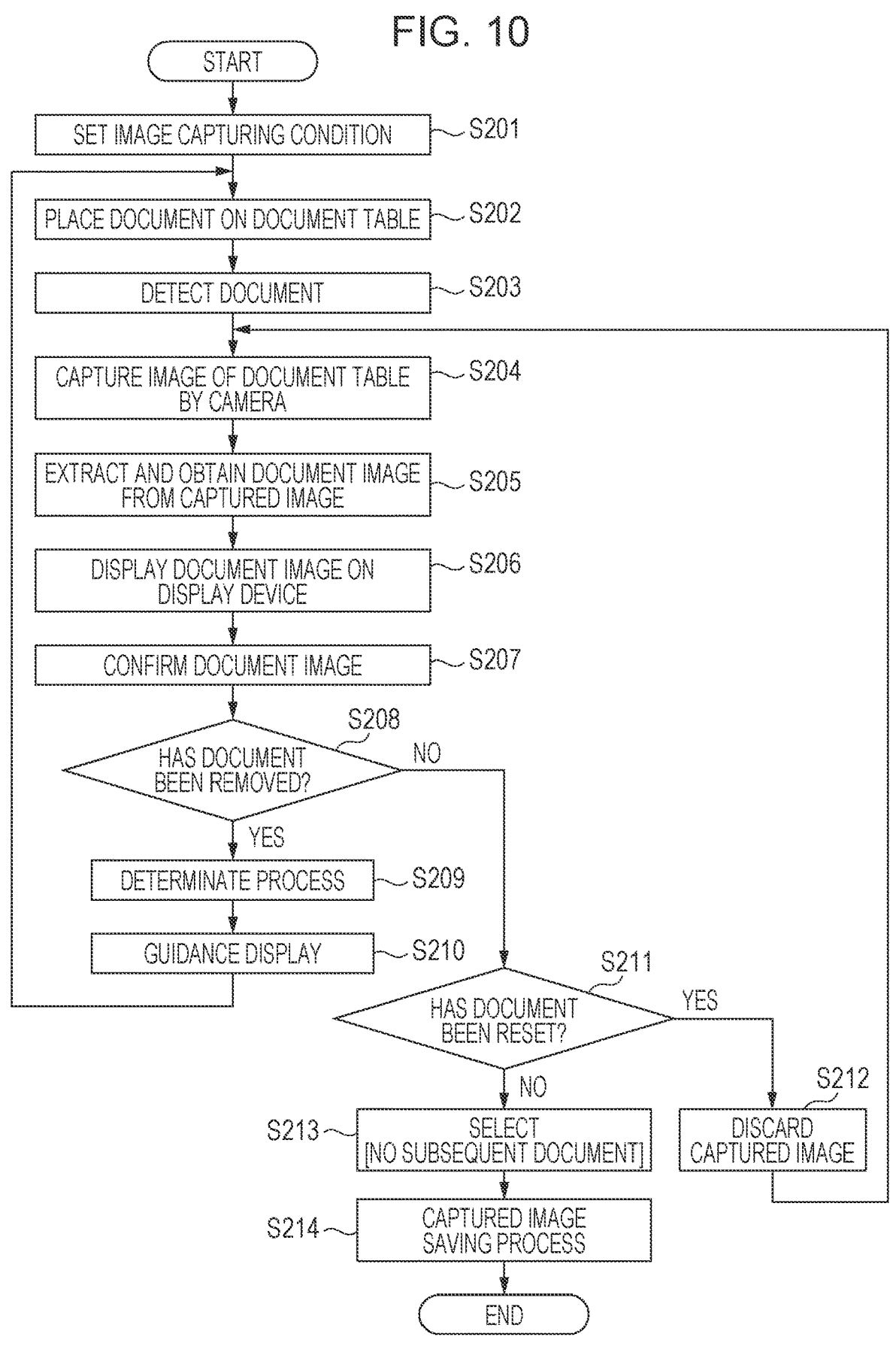
FIG. 10 is a flowchart illustrating the details of a process when the process is executed.

FIG. 10 is a flowchart illustrating the details of the process explained in FIGS. 8A to 8C, FIGS. 9A to 9C, when they are executed.

Note that the processes in step S201 to step S207 are the same as the processes in step S101 to step S107 illustrated in FIG. 7, and the processes in and after step S208 will be described.

In the process of step S208, it is determined whether the document G has been removed from the document stand 3.

When it is determined in step S208 whether the document G has been removed from the document stand 3, the determinate process is performed on the captured image (step S209), and a process of saving the captured image is performed. More specifically, for example, when the document G is moved in the left direction, and removed from the document stand 3 by a user, a determinate process is performed on the captured image, and a process of saving the captured image is performed.

Subsequently, as described above, guidance is displayed on the display device 7 to prompt a user to set a new document G on the document stand 3 (step S210). Subsequently, the processes in and after step S202 are performed again.

In contrast, when it is determined in step S208 that the document G has not removed from the document stand 3, it is determined whether the document G has been reset (step S211).

When it is determined that the document G has been reset, a process of discarding the captured image obtained before the reset is performed (step S212). Subsequently, the processes in and after step S204 are performed again. Thus, the document G after the reset is re-captured.

In contrast, when it is determined in step S211 that the document G has not been reset, the flow proceeds to the process in step S213.

In this process example, in the process in step S213, a user selects the selection item, "No subsequent document" displayed on the display device 7. The process example illustrated in FIG. 10 exemplifies the process when a user selects the selection item "No subsequent document".

When a user selects the selection item "No subsequent document", the flow proceeds to the process in step S214. In the process in step S214, a process of saving the captured images obtained so far as one file is performed.

Figure 11:
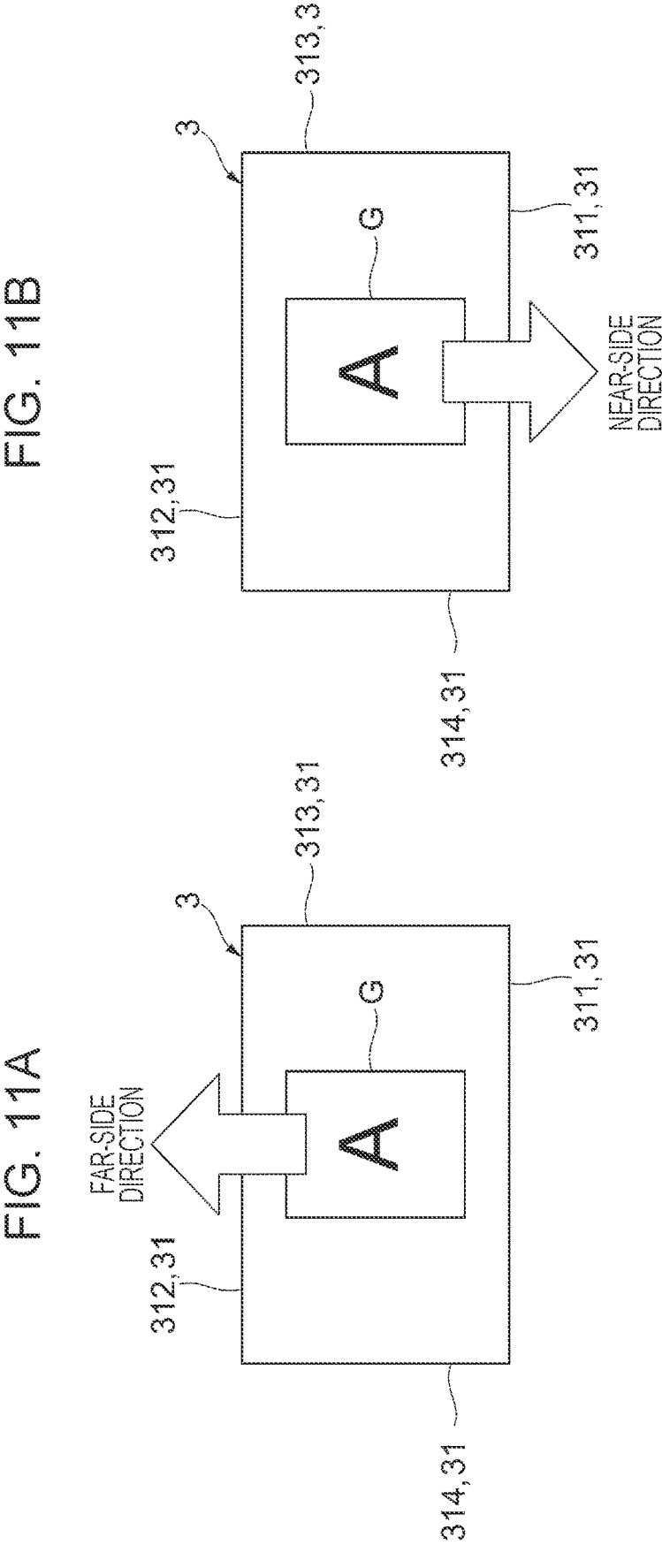
FIGS. 11A and 11B are views illustrating another process example.

FIGS. 11A and 11B are illustrations showing another process example.

In addition to the processes described above, as illustrated in FIG. 11A, when the document G is moved in the far-side direction of the document stand 3 before the document G is removed, it may be determined that instructions "No subsequent document" are provided by a user, and one image file may be generated based on the captured images obtained so far.

In the exemplary embodiment, as described above, when a first document G is read, a reading job is started. For multiple documents G, with the reading job started, the documents G are successively set on the document stand 3, and the documents G are sequentially read.

For example, when a user provides instructions "No subsequent document", the reading job is completed, and a file consisting of multiple captured images obtained by reading multiple documents G is generated.

In other words, when a user provides instructions "No subsequent document", the CPU 11*a* determines that the most recently read document is the last document. The CPU 11*a* generates a file consisting of the captured images obtained by capturing all documents G from the first document G to the last document G.

In the case of the above process, as described above, it is designed that when the document G is moved in the far-side direction of the document stand 3, it is determined that instructions "No subsequent document" are provided by a user, thus the operability of a user is improved.

When the instructions "No subsequent document" are provided, a selection item "No subsequent document" may be displayed on the display device 7, and upon selection of the selection item, the reading job may be completed. In this situation, a user needs to perform an operation for the display device 7.

In contrast, as in the exemplary embodiment, when it is designed that upon movement of the document G in the far-side direction of the document stand 3, the reading job is completed, a user does not need to perform an operation for the display device 7.

Note that the selection item "No subsequent document" on the display device 7 does not need to be deleted, and when the document G is moved in the far-side direction of the document stand 3 while the selection item "No subsequent document" being displayed, the reading job may be completed.

Alternatively, in addition, as illustrated in FIG. 11B, when the document G is moved in the near-side direction of the document stand 3 before the document G is removed, a process of cancelling the reading job may be performed. In this situation, the captured images obtained so far are discarded.

Note that when the document G is moved in the near-side direction of the document stand 3, the reading job may be cancelled after confirming the cancellation with a user without cancelling the reading job immediately.

More specifically, for example, a screen to confirm the cancellation of the reading job with a user is displayed on the display device 7, and when a user gives instructions for cancellation, the reading job may be cancelled.

Note that as described above, a selection item for selecting "Cancel" on the display device 7 does not need to be deleted, and when the document G is moved in the near-side direction of the document stand 3 while the selection item "Cancel" being displayed, the reading job may be cancelled.

Note that in the present specification, hereinafter the far-side direction may be referred to as the "upper direction", and the near-side direction may be referred to as the "lower direction".

In the process illustrated in FIGS. 11A and 11B, the CPU 11*a* makes a determination as to whether a process of reading the document G is continued based on the movement of the document G on the document stand 3.

The process illustrated in FIG. 11A exemplifies a case in which the movement of the document G on the document stand 3 is a movement in the far-side direction, which is an example of a predetermined specific movement.

In this situation, the CPU 11*a* determines that the document G is the last document, and makes a determination to generate a file including the results of reading of the document G.

In addition, the process illustrated in FIG. 11B exemplifies a case in which the movement of the document G on the document stand 3 is a movement in the near-side direction, which is another example of a predetermined specific movement.

In this situation, the CPU 11*a* makes a determination to cancel the process of reading the document G.

Alternatively, in addition, when a new document G is not detected after a lapse of a predetermined time since removal of the document G from the document stand 3, a selection item such as "No subsequent document" or a selection item such as "Job cancelled" may be displayed on the display device 7.

When this process is performed, a notification is substantially provided to prompt a user to input the next operation, thus the possibility of execution of the next process by a user increases.

When the next document G is not placed after the document G is removed from the document stand 3 by a user, the process of reading the document G is in an interrupted state. In this situation, when selection items are displayed as described above, the possibility of execution of the next process increases.

Note that in a case in which a new document G is not detected after a lapse of a predetermined time since removal of the document G from the document stand 3, when a new document G is detected subsequently, the new document G may be read.

Alternatively, in addition, when a predetermined time has elapsed without any operation by a user since the above-mentioned selection items such as "No subsequent document" and "Job cancelled" are displayed, the reading job may be terminated and a file may be generated, or a process of discarding the captured images obtained so far may be performed.

Alternatively, in addition, for example, a user may make a mistake in the movement direction of the document G when removing it, and for example, a situation may occur in which a captured image is deleted although the user wants a determinate process to be performed.

Thus, for example, when a user performs an operation to cause the captured image to be deleted, a screen to confirm the deletion of the captured image with a user may be displayed to inquire of the user. When a user gives "Delete" instructions in response to the inquiry, the captured image may be deleted.

In other words, when a user performs an operation to cause the captured image to be deleted, instructions from a user may be further received, and a final process may be performed based on the instructions.

Alternatively, in addition, a user may make a mistake in the movement direction of the document G when removing it from the document stand 3, and a situation may occur in which a captured image which is supposed to be deleted by a user undergoes a determinate process.

Thus, in this situation, as described above, a screen to confirm the determinate process on the captured image with a user may be displayed to inquire of the user.

When a user gives "Determine" instructions in response to the inquiry, the captured image may be determined.

When a user removes the document G, as described above, instructions from the user may be further received. The final process may be performed based on the instructions from a user.

Alternatively, in addition, for example, selection items for receiving instructions for undoing a process may be displayed on the display device 7, and when the instructions are given from a user, an undo process may be performed to return to the state before the process prior to the instructions is performed.

More specifically, for example, a selection item such as [Undo] button to return from a state of discarded captured image to a previous state of the non-discarded captured image is displayed on the display device 7. When a user selects the selection item, the discarded captured image may be returned to the previous state of the non-discarded captured image.

In the above, a case has been described in which as an example of a process to be performed when the document G is operated by a user, a process of determining the captured image and a process of discarding the captured image are performed.

However, the process to be performed when the document G is operated is not limited to these, and for example, a process of determining an output form of the captured image may be performed based on an operation by a user on the document G.

Specifically, for example, an output form of the captured image may be determined to be output via E-mail or output through FAX transmission based on an operation by a user on the document G.

Alternatively, in addition, for example, a file format when the captured image is stored may be determined based on an operation by a user on the document G.

In addition, as the process to be performed when the document G is operated by a user, for example, a process of determining a reading condition for the document G may be mentioned.

When the document G is operated by a user, a reading condition for the document G may be determined based on the movement of the document G. Specifically, for example, a resolution when the document G is read and whether the document G is read in color or monochrome may be determined.

In the above, as the operation for the document G, an example of operation has been described in which the document G is moved in either one of four directions:

upward, downward, rightward, and leftward; however, the operation for the document G is not limited to this.

For example, a user slides the document G in the right or left direction or in the upward or downward direction on the document stand 3, and when this movement of sliding the document is detected, a process corresponding to this movement may be performed.

Also, the movement direction of the document G is not limited to the right or left direction or the upward or downward direction, and a movement of the document G which is moved along a diagonal direction of the document stand 3 may be detected, and a process corresponding to this movement may be performed.

In addition, for example, when a user reverses the front and back of the document G on the document stand 3, the reversal may be detected, and a process corresponding to the reversal may be performed.

The relationship between the movement direction of the document G when the document G is removed and the process associated with the movement direction is not limited to the above relationship, and may be another relationship.

In the above, a case has been described in which when the document G is moved in the left direction and removed, a determinate process is performed, and when the document G is moved in the right direction and removed, a discarding process is performed.

However, without being limited to this, for example, when the document G is moved in the right direction and removed, a determinate process may be performed, and when the document G is moved in the left direction and removed, a discarding process may be performed.

In FIGS. 11A and 11B, a case has been described as an example in which when the document G is moved in the upward direction and removed, a process of determining that there is no subsequent document is performed, and when the document G is moved in the downward direction and removed, a process of cancelling the reading job is performed.

However, without being limited to this, for example, when the document G is moved in the upward direction and removed, a process of cancelling the reading job may be performed, and when the document G is moved in the downward direction and removed, a process of determining that there is no subsequent document may be performed.

Alternatively, in addition, for example, when the document G is moved in the upward direction or the downward direction, and removed, a determinate process, or a discarding process may be performed.

Alternatively, when the document G is moved in the left direction or the right direction, and removed, a process of determining that there is no subsequent document, or a process of cancelling the reading job may be performed.

In the above, a case has been described in which when the document G to be removed is completely displaced from the document stand 3, a determinate process or a discarding process is performed; however, complete displacement of the document G from the document stand 3 may not be a condition for starting a process.

When the document G is moved in the left direction or the right direction, a determinate process or a discarding process may be performed. Alternatively, when the document G is moved in the upward direction or the downward direction, a process of determining that there is no subsequent document, or a process of cancelling the reading job may be performed.

In the process examples illustrated in FIGS. 8A to 8C, FIGS. 9A to 9C, a case has been described in which when the state of the document G is changed, image re-capturing is determined.

However, without being limited to this, the state of the document G is pre-set, and when the state of the document G is changed and the state of the document G is in a predetermined state, a determination may be made to perform various processes such as image re-capturing.

In other words, when the document G on the document stand 3 is rotated or moved, and the document G is in a specific state, a determination may be made to re-capture an image of the document G.

Specifically, for example, referring to the process example illustrated in FIGS. 8A to 8C, when the document G is rotated and the document G is in an upright state, a determination may be made to re-capture an image of the document G.

Also, referring to the process example illustrated in FIGS. 9A to 9C, when the document G is moved and the document G is disposed at a predetermined position such as the central position of the document stand 3, a determination may be made to re-capture an image of the document G.

Alternatively, in addition, based on a side 31 located at a position to which the document G is moved, the side 31 being among the four sides 31 (see FIG. 1) of the document stand 3 formed in a rectangular shape, the above-mentioned determination related to reading of the document G may be made.

In this situation, the content of the above-mentioned determination related to reading of the document G may be differentiated according to the side 31 located at a position to which the document G is moved.

In the above, a determination related to reading of the document G is mostly made according to the movement direction of the document G; however, the content of a determination related to reading of the document G may be differentiated according to a side 31 located at the position to which the document G is moved and through which the document G is passed.

In the process examples illustrated in FIGS. 5A to 5D, FIGS. 6A to 6D, FIGS. 11A and 11B, as an example, a case has been described in which a determination related to the process to be performed is made based on the movement of the document G when removed from the document stand 3; however, the movement of the document G when the determination is made is not limited to the movement of the document G when removed.

For example, a determination related to the process to be performed may be made based on the movement of the document G when placed on the document stand 3.

Specifically, a reading condition for reading the document G and an output form of an obtained captured image may be determined based on the movement of the document G when placed on the document stand 3.

Also, for example, for the captured image of another document G read immediately before the reading of the document G, a determination as to whether a determinate process is performed or a determination as to whether a discarding process is performed may be performed based on the movement of the document G when placed on the document stand 3.

For example, when the document G is placed on the document stand 3 after moved from the left side of the document stand 3, a determinate process may be performed on the captured image of another document G read immediately before the reading of the document G.

In addition, for example, when the document G is placed on the document stand 3 after moved from the right side of the document stand 3, a discarding process may be performed on the captured image of another document G read immediately before the reading of the document G.

Figure 12:
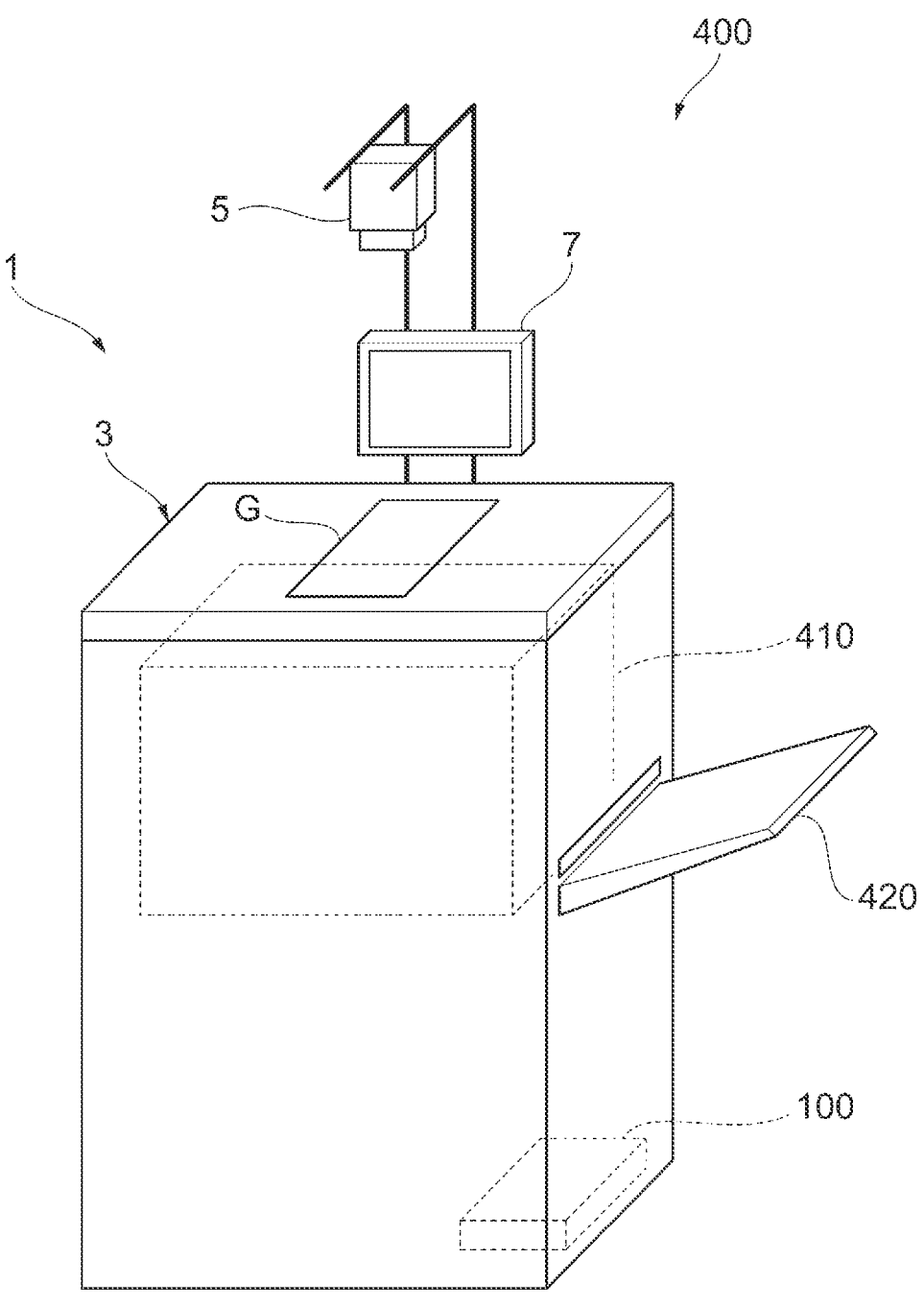
FIG. 12 illustrates an image forming apparatus.

In addition, as illustrated in FIG. 12 (illustrating the image forming apparatus), the image reading apparatus 1 may be provided as part of an image forming apparatus 400.

In the image forming apparatus 400, the above-described image reading apparatus 1 is provided at an upper portion of the image forming apparatus 400.

As described above, the image reading apparatus 1 is provided with the document stand 3 on which the document G as a target image to be read is placed, and which supports the document G from below; the camera 5 as an example of an image capture device that captures the document G placed on the document stand 3; and a display device 7 that displays information to a user. Furthermore, the image forming apparatus 400 is provided the information processing device 100 that processes information related to capturing the document G.

In addition, the image forming apparatus 400 is provided with an image former 410 inside the image forming apparatus 400, the image former 410 being configured to form an image on a recording material such as a sheet of paper.

The image former 410 forms an image on a recording material supplied from a recording material storage (not illustrated) using an ink jet system or an electrophotographic system.

More specifically, the image former 410 forms an image on a recording material using an ink jet system or an electrophotographic system based on a captured image obtained by the image reading apparatus 1 or image data transmitted from the outside of the image forming apparatus 400 to the image forming apparatus 400.

The recording material with an image formed is transported to a paper stacking unit 420, and stacked thereon.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing device comprising:

a processor configured to:

detect movement of a document placed on a document stand included in a device that reads the document by capturing an image of the document stand; and make a determination related to reading of the document based on the movement of the document on the document stand.

(((2)))

The information processing device according to (((1))), wherein the processor is configured to:

make a determination related to handling of a result of reading of the document based on the movement of the document on the document stand.

(((3)))

The information processing device according to (((2))), wherein the processor is configured to:

when the movement of the document on the document stand is a predetermined specific movement, make a determination to store the result of reading in an information storage.

(((4)))

The information processing device according to (((2))), wherein the processor is configured to:

when the movement of the document on the document stand is a predetermined specific movement, make a determination to discard the result of reading.

(((5)))

The information processing device according to (((1))), wherein the processor is configured to:

make a determination as to whether a process of reading the document is continued based on the movement of the document on the document stand.

(((6)))

The information processing device according to (((5))), wherein the processor is configured to:

when the movement of the document on the document stand is a predetermined specific movement, determine that the movement is a last document, and make a determination to generate a file including the result of reading of the document.

(((7)))

The information processing device according to (((5))), wherein the processor is configured to:

when the movement of the document on the document stand is a predetermined specific movement, make a determination to cancel the process of reading the document.

(((8)))

The information processing device according to any one of (((1))) to (((7))), wherein the processor is configured to:

detect movement of the document placed on the document stand based on an image obtained by the capturing of the document stand.

(((9)))

The information processing device according to any one of (((1))) to (((8))), wherein the processor is configured to:

make the determination related to reading of the document based on movement of the document when the document on the document stand is moved along a surface of the document stand.

(((10)))

The information processing device according to (((9))), wherein the processor is configured to:

make the determination related to reading of the document based on a movement direction of the document when the document is moved along the surface of the document stand.

(((11)))

The information processing device according to (((10))), wherein the processor is configured to:

differentiate content of the determination related to reading of the document based on a side located at a position to which the document is moved, the side being among four sides of the document stand formed in a rectangular shape.

(((12)))

The information processing device according to any one of (((1))) to (((11))), wherein the processor is configured to:

make the determination related to reading of the document on the document stand based on the movement of the document when removed from the document stand.

(((13)))

The information processing device according to (((1))), wherein the processor is configured to:

when the document on the document stand is rotated or moved, make a determination to re-capture the document.

(((14)))

The information processing device according to (((13))), wherein the processor is configured to:

when the document on the document stand is rotated or moved, and the document is in a specific state, make a determination to re-capture the document.

(((15)))

An image reading apparatus comprising:

a device that reads a document by capturing an image of a document stand on which the document is placed; and an information processing apparatus that makes a determination related to reading of the document, wherein the information processing apparatus includes the information processing device according to any one of (((1))) to (((14))).

(((16)))

An image forming apparatus comprising:

a device that reads a document by capturing an image of a document stand on which the document is placed;

an information processing apparatus that makes a determination related to reading of the document; and an image former that forms an image on a recording material, wherein the information processing apparatus includes the information processing device according to any one of (((1))) to (((14))).

(((17)))

A program causing a computer to execute a process comprising:

detecting movement of a document placed on a document stand included in a device that reads the document by capturing an image of the document stand; and making a determination related to reading of the document based on the movement of the document on the document stand.

What is claimed is:

1. An information processing device comprising:

a processor configured to:

detect movement of a document placed on a document stand included in a device that reads the document by capturing an image of the document stand; and make a determination related to reading of the document based on the movement of the document on the document stand;

make a determination related to handling of a result of reading of the document based on the movement of the document on the document stand; and when the movement of the document on the document stand is a predetermined specific movement, make a determination to store the result of reading in an information storage.

2. The information processing device according to claim 1, wherein the processor is configured to:

when the movement of the document on the document stand is another predetermined specific movement, make a determination to discard the result of reading.

3. The information processing device according to claim 1, wherein the processor is configured to:

make a determination as to whether a process of reading the document is continued based on the movement of the document on the document stand.

4. The information processing device according to claim 3, wherein the processor is configured to:

when the movement of the document on the document stand is another predetermined specific movement, determine that the document is a last document, and make a determination to generate a file including the result of reading of the document.

5. The information processing device according to claim 3, wherein the processor is configured to:

when the movement of the document on the document stand is another predetermined specific movement, make a determination to cancel the process of reading the document.

6. The information processing device according to claim 1, wherein the processor is configured to:

detect movement of the document placed on the document stand based on an image obtained by the capturing of the document stand.

7. The information processing device according to claim 1, wherein the processor is configured to:

make the determination related to reading of the document based on movement of the document when the document on the document stand is moved along a surface of the document stand.

8. The information processing device according to claim 7, wherein the processor is configured to:

make the determination related to reading of the document based on a movement direction of the document when the document is moved along the surface of the document stand.

9. The information processing device according to claim 8, wherein the processor is configured to:

differentiate content of the determination related to reading of the document based on a side located at a position to which the document is moved, the side being among four sides of the document stand formed in a rectangular shape.

10. The information processing device according to claim 1, wherein the processor is configured to:

make the determination related to reading of the document on the document stand based on the movement of the document when removed from the document stand.

11. The information processing device according to claim 1, wherein the processor is configured to:

when the document on the document stand is rotated or moved, make a determination to re-capture the document.

12. The information processing device according to claim 11, wherein the processor is configured to:

when the document on the document stand is rotated or moved, and the document is in a specific state, make a determination to re-capture the document.

13. An image reading apparatus comprising:

a device that reads a document by capturing an image of a document stand on which the document is placed; and an information processing apparatus that makes a determination related to reading of the document, wherein the information processing apparatus includes the information processing device according to claim 1.

14. An image forming apparatus comprising:

a device that reads a document by capturing an image of a document stand on which the document is placed;

an information processing apparatus that makes a determination related to reading of the document; and an image former that forms an image on a recording material, wherein the information processing apparatus includes the information processing device according to claim 1.

15. A non-transitory computer readable medium storing a program causing a computer to execute a process comprising:

detecting movement of a document placed on a document stand included in a device that reads the document by capturing an image of the document stand;

making a determination related to reading of the document based on the movement of the document on the document stand;

making a determination related to handling of a result of reading of the document based on the movement of the document on the document stand; and when the movement of the document on the document stand is a predetermined specific movement, making a determination to store the result of reading in an information storage.

16. An information processing method comprising:

detecting movement of a document placed on a document stand included in a device that reads the document by capturing an image of the document stand;

making a determination related to reading of the document based on the movement of the document on the document stand;

making a determination related to handling of a result of reading of the document based on the movement of the document on the document stand; and when the movement of the document on the document stand is a predetermined specific movement, making a determination to store the result of reading in an information storage.

\* \* \* \* \*